(12) United States Patent
Rübbelke (10) Patent No.: US 9,017,053 B2
(45) Date of Patent: Apr. 28, 2015

(54) DEVICE FOR COOLING A FILM

(75) Inventor: Ingo Rübbelke, Geseke (DE)

(73) Assignee: Windmoller & Holscher KG (DE)

( * ) Notice: Subject to any disclaimer, the term of this patent is extended or adjusted under 35 U.S.C. 154(b) by 0 days.

(21) Appl. No.: 13/993,776

(22) PCT Filed: Dec. 13, 2011

(86) PCT No.: PCT/EP2011/072648
§ 371 (c)(1),
(2), (4) Date: Oct. 23, 2013

(87) PCT Pub. No.: WO2012/080276
PCT Pub. Date: Jun. 21, 2012

(65) Prior Publication Data
US 2014/0057010 A1    Feb. 27, 2014

(30) Foreign Application Priority Data

Dec. 14, 2010  (DE) .......................... 10 2010 063 010

(51) Int. Cl.
*B29C 47/92*    (2006.01)
*B29C 47/88*    (2006.01)
(Continued)

(52) U.S. Cl.
CPC ......... B29C 47/8815 (2013.01); B29C 47/0021 (2013.01); *B29C 47/0026* (2013.01); *B29C 47/0057* (2013.01); *B29C 47/009* (2013.01); B29C 47/8835 (2013.01); *B29C 47/8885* (2013.01); B29C 47/92 (2013.01); *B29C 2791/007* (2013.01); *B29C 2947/92152* (2013.01); *B29C 2947/92447* (2013.01); *B29C 2947/926* (2013.01); *B29C 2947/92619* (2013.01); *B29C 2947/92647* (2013.01);
(Continued)

(58) Field of Classification Search
None
See application file for complete search history.

(56) References Cited

U.S. PATENT DOCUMENTS 2,632,206 A    3/1953    Pierce
3,959,425 A    5/1976    Herrington
(Continued)

FOREIGN PATENT DOCUMENTS

CN    101035667 A    9/2007
DE    2658518 A1    6/1978
(Continued)

OTHER PUBLICATIONS

International Search Report issued Nov. 15, 2012 re: PCT/EP2011/072648; citing: EP 1 616 687 A1, EP 1 719 602 A1, US 2008/061460 A1, EP 1 982 819 A2, WO 2006/022391 A1, WO 2006/039813 A1, EP 0 285 368 A2, US 2,632,206 A, DE 36 10 488 A1, US 4,254,183 A, DE 26 58 518 A1 and US 3,959,425 A.
(Continued)

*Primary Examiner* — Jacob Thomas Minskey
(74) *Attorney, Agent, or Firm* — Cantor Colburn LLP (57) ABSTRACT

The invention relates to a device for cooling a film (20), in particular a film tube (20), wherein the film (20) can be produced from a blower head (4) of a film extrusion apparatus (50), in particular a blown film extruder (51); the invention has a cooling device (5), wherein a flow volume of cooling gas (12) can flow out of the cooling device at a cooling temperature in such a manner that the flow volume of cooling gas (12) can flow over the film (20). According to the invention, means are provided such that the flow volume of cooling gas (12) and the cooling gas temperature can be adjusted simultaneously.

13 Claims, 5 Drawing Sheets

(51) Int. Cl.
*B29C 47/00* (2006.01)
*B29C 47/86* (2006.01)

(52) U.S. Cl.
CPC .............. *B29C2947/92657* (2013.01); *B29C 2947/92704* (2013.01); *B29C 2947/92828* (2013.01); *B29C 2947/92923* (2013.01); *B29C 2947/92942* (2013.01); *B29C 2947/92971* (2013.01); *B29C 47/864* (2013.01)

(56) References Cited

U.S. PATENT DOCUMENTS

| | | |
|---|---|---|
| 4,254,183 A | 3/1981 | Nash et al. |
| 2008/0061460 A1 | 3/2008 | Zimmermann et al. |

FOREIGN PATENT DOCUMENTS

| | | |
|---|---|---|
| DE | 3610488 A1 | 10/1986 |
| EP | 0285368 A2 | 10/1988 |
| EP | 1616687 A1 | 1/2006 |
| EP | 1719602 A1 | 11/2006 |
| EP | 1982819 A2 | 10/2008 |
| WO | 2006022391 A1 | 3/2006 |
| WO | 2006039813 A1 | 4/2006 |

OTHER PUBLICATIONS

Chinese Office Action issued Dec. 29, 2014 re: Chinese Application No. 2011800670173; citing: US 20080061460 A1, CN 101035667 A and EP 1616687 A1.

DEVICE FOR COOLING A FILM

The invention relates to a device for cooling a film, in the field of film production.

Blown film extruders of today can, as long as a modern profile thickness regulating system is used, achieve a maximum tolerance deviation of the film thickness of approx. +/−4% over the entire film periphery. Despite this value being good compared to the value of 8-10% in unregulated operation, the adjustment function in the known profile thickness regulating systems is not adequate to achieve a straightforward film spooling without the reversible draw-off devices which are in use today in nearly all blown film extruders. By reversing the entire draw-off and flattening device, the remaining thick points and thin points of the film web which remain after the profile thickness regulation are continuously repositioned, and in this way it is possible to prevent an undesired formation of a circular ring on the film spool resulting from the superimposition of the defects. The current prior art includes the disadvantages resulting from the cost-intensive and complex construction of the reversing draw-off devices which counteract the formation of the circular ring. The additional costs of approx. 25% of the total extruder price are the result of higher cost inputs for the construction of the support tower, because the heavy weight of the reversing draw-off device must be installed at a great height, and also the complicated and expensive mechanism of the reversing gearbox, air turning bars, and deflection rolls and bow rolls. In addition, the portion of the height of the production facility which can be used for cooling is greatly reduced as a result of the tall construction of the reversing draw-off device. In addition to installation costs, the complex construction results in a more difficult start-up, as well as error-prone operation of the reversing draw-off system. In particular, very thin and sticky film webs frequently adhere to the air turning bars and then immediately cause a production halt.

The problem addressed by the invention is that of implementing a device for the cooling of a film, in the field of film production, such that it is possible to produce film having the least possible film thickness variation, in a simple manner.

The problem named above is addressed by the combined features of claim 1. Advantageous implementations are given in the dependent claims.

According to the invention, means are included such that it is possible to adjust the flow volume of cooling gas and the cooling gas temperature at the same time. The means are configured in such a manner that it is possible to simultaneously adjust the flow volume of cooling gas and the cooling gas temperature in order to achieve an optimization of the film profile thickness. In order to make it possible to regulate the thickness of the film, and particularly the thickness of the film tube, the extruded plastic melt which is discharged from the blower head is variably warmed and/or cooled via the cooling device, whereby it is possible to adjust and/or influence the thickness profile of the film. The process takes advantage of the fact that during blowing—for example of the film tube out of the blown film extruder—the warmer regions stretch more, and the cooler regions stretch less. This means that a higher temperature of air in the flow volume of cooling gas creates a thinner draw of the film. The invention also comprises the parallel technical advantage of the cooling device, wherein it is possible to intelligently vary the cooling gas volume in addition to adjusting the cooling gas temperature, and particularly according to the cooling gas temperature. This means that the film is further stretched and/or thinned when there is a lower flow volume of cooling gas. In this way, the adjustment efficacy of both parameters, meaning the flow volume of cooling gas and the cooling gas temperature, can be increased several times over. As a result, the cooling device is capable of adjusting the thickness profile of the film in a very short time. The same also of course applies for a cooling device which is used in a sheet film extruder.

It can likewise be contemplated that means are included such that the flow volume of cooling gas is automatically controlled or regulated according to the cooling gas temperature—or the other way around. This means that, with a change in the cooling gas temperature, the flow volume of cooling gas can simultaneously be changed in parallel. To effect a thinning of the film at a defined point, the cooling device can function in such a manner that the flow volume of cooling gas is reduced on the specific section of the film, at the same time as the cooling gas temperature is increased, for example.

The flow volume of cooling gas can be modified by at least one valve element arranged advantageously in the cooling device. The valve element can be a flap, by way of example, which is able to move inside the cooling device in order to vary the flow volume of cooling gas exiting the cooling device in the direction of the film. At the same time, a heating element can be integrated inside the cooling device, and can modify the cooling temperature according to the valve element.

In an additional measure which improves the invention, at least one regulator element can be arranged in the cooling device, wherein the valve element and a heating element are integrated in the regulator element in order to simultaneously control and/or to regulate the flow volume of cooling gas and the cooling gas temperature. The regulator element therefore functions to adjust the flow volume of cooling gas and the cooling gas temperature at the same time according to defined specifications. In one possible embodiment of the invention, the valve element can be a deformable bimetal adjuster element, by means of which it is possible to modify the flow volume of cooling gas upon modification of the cooling gas temperature, by means of narrowing or enlarging a cross-section of the cooling gas channel arranged in the cooling device, wherein the flow volume of cooling gas can be fed through said cooling gas channel. The bimetal adjuster element in this case is coupled to the heating element in such a manner that the change in the cooling gas temperature of the flow volume of cooling gas which flows around the bimetal adjuster element simultaneously has the effect that the bimetal adjuster element accordingly deforms and/or adjusts, thereby making it possible to vary the flow volume of cooling gas. A cooling gas channel with a defined cooling gas channel cross-section is advantageously positioned in the cooling device, and particularly in the regulator element, and the deformable bimetal adjuster element is arranged in said cooling gas channel cross-section. If at this point the bimetal adjuster element deforms inside the cooling gas channel, the cooling gas channel cross-section is changed, thereby changing the flow volume of cooling gas exiting the same.

By way of example, it can be contemplated that the cooling device is designed as a cooling ring which has a plurality of regulator elements on the periphery of the cooling ring. As such, the cooling device can have a plurality of regulator elements on the periphery thereof, wherein by means of the same it is possible to influence the film thickness at any point on the periphery of the film tube.

As an alternative, it can be contemplated that the cooling device is designed as a rod-shaped cooling element which has a plurality of regulator elements which are arranged next to each other linearly. The rod-shaped cooling element can be used in a sheet film extruder, by way of example, in order to influence the film thickness of the sheet film.

It can advantageously be the case that a drive device is included for the purpose of moving the cooling device and/or the regulator elements, and particularly wherein the drive device is a mechanical drive device. By way of example, the cooling device and/or the regulator element can move, and/or can move back and forth, and/or can be reversed, laterally, along the film. It can likewise be contemplated that the cooling device and/or the regulator elements can move and/or can move back and forth, and/or can be reversed, around the film tube. In one possible embodiment of the invention, the cooling ring and/or the regulator elements can be moved by means of the drive device about an axis of rotation between 0 and 360°, and preferably between 5 and 45°. This means that the drive device can move the entire cooling device, including the regulator elements. It can likewise be contemplated that the drive device can only move the regulator elements inside the cooling device. One advantage of the use of the drive device is that it is possible to efficaciously prevent the undesired formation of a circular ring as appears in the prior art. An artificial displacement of the thick and thin points can be achieved via the movement of the cooling device and/or the regulator elements, such that a manner of "smearing" can be achieved for the thick and thin points on the film. As a result, the defects no longer add up at a defined point on the film spool. Rather, a manner of evening-out of the defects on the film spool is effected. In the best-case scenario, it is essentially possible to do away with a cost-intensive reversing draw-off device, which is used in the prior art to counteract the formation of a circular ring on the film spool. An additional important aspect of the drive device can be that the cooling device and/or the regulator elements can be adjusted exactly on the point and/or on the position where the film must be influenced, due to its thickness profile, particularly where the thickness profile must be enlarged or reduced at the defined positions.

The function and task of the drive device named above can likewise be achieved by an electronic control for the regulator elements. In this case, it can be contemplated that a continuous, modified electronic control is included for the regulator elements, whereby it is possible to carry out an electronic reversal of the regulator element by means of the electronic control. According to the invention, the electronic control can control the regulator elements by giving a variable adjustment speed and/or a variable adjustment parameter and/or a variable speed and/or constant speed based on a random generation. The advantage of the electronic control is that no complex mechanical drive device is necessary to influence the profile thickness of each defined position on the film in a targeted manner. Likewise, the drive device can be combined with an electronic control.

It can likewise be contemplated that the electronic control takes into account a correction value, particularly for the best possible regulated film thickness profile, in order to control individual regulator elements or groups of regulator elements, whereby it is possible to generate artificial thick points and/or thin points on the film. The correction value can be adjusted, whereby it is possible to generate artificial thick points and/or thin points on the film for the purpose of preventing the formation of circular rings. The adjustable correction value can be varied in any manner for the adjustment value and switch-on duration thereof. Likewise, the adjustment parameter, switch-on duration, and positional variable—correction value automatically optimizes itself for the best possible film thickness profile, in a regulation feedback loop with a continuous film thickness measuring device.

In an additional measure which improves the invention, the valve element can be designed from at least two bimetal adjuster elements, wherein each bimetal adjuster element has a free, moving end wherein the free ends are arranged adjacent to each other; and each bimetal adjuster element has a stationary end attachment region, wherein the stationary attachment regions face away from each other. The bimetal adjuster elements are positioned in the cooling gas channel. It has been surprisingly demonstrated that it is possible to prevent damaging turbulence effects inside the cooling gas channel and/or upon the exiting of the flow volume of cooling gas towards the film, in this manner. The bimetal adjuster elements can be arranged to at least partially overlap each other. The two bimetal adjuster elements deform according to the temperature of the heating element, thereby making it possible to simultaneously adjust the flow volume of cooling gas and the cooling gas temperature via the regulator element.

In an additional advantageous embodiment, the bimetal adjuster element can be sheathed by a flexible skin. The flexible skin can be a thin film, by way of example, which surrounds the bimetal adjuster element, thereby likewise making it possible to prevent turbulence effects inside the cooling gas channel and/or upon the exiting of the flow volume of cooling gas towards the film.

According to the invention, a film extruder is included for the production of a film, having the following features:
a blower head which allows the exit of the film,
a cooling device for the purpose of cooling the film exiting from the blower head,
a thickness measuring device for the purpose of measuring the film thickness,
an electronic device which is particularly designed as a control and/or regulating device,
wherein the electronic device has signal communication with the cooling device and the thickness measuring device in order to influence the film thickness,
wherein a flow volume of cooling gas can flow out of the cooling device at a cooling gas temperature, in such a manner that the flow volume of cooling gas can flow over the film.

According to the invention, means are included such that the flow volume of cooling gas and the cooling gas temperature can be adjusted simultaneously.

In one advantageous embodiment of the invention, the cooling device can be integrated on the blower head.

In addition, it can be contemplated that the film extruder apparatus is designed as a blown film extruder, and particularly that the film extruder apparatus is designed with a vertical, downward oriented blown film extruder with water cooling.

As an alternative, the film extruder apparatus can be designed as a sheet film extruder, The invention refers to a specific combination of regulation principles, such as:
A) regulation of the flow volume of cooling gas
  The flow volume of cooling gas can be regulated in multiple segments by means of mechanically initiated and adjustable cross-section narrowing of the individual cooling gas channels of the regulator elements. Likewise, the flow volume of cooling gas can be regulated via a plurality of valve elements. The result: a smaller flow volume of cooling gas results in a locally reduced cooling effect, such that it is possible to mold the melt of the film at these positions longer and accordingly thinner.
B) regulation of the cooling gas temperature
  The segmental increase of the cooling gas temperature: the result is analogous to A, because higher cooling gas temperature likewise results in a lower local cooling effect.

The combination of the principles listed above can be realized by the connection of a heat source (the heating element) to a valve element, for example having a bimetal strip. In this case, the heat source (e.g., a heating cartridge) has the task of bringing the cooling gas stream to a higher temperature (regulation influence B), on the one hand; and on the other hand, it has the task of deforming the bimetal arranged above the heat source. By means of the deformation of the bimetal, it is possible to regulate a narrowing of the cooling gas channel cross-section inside the cooling gas volume in parallel with the temperature adjustment, for a reduction in the flow volume of cooling gas (regulation influence A), such that a significantly enhanced adjustment function of the regulatory segments results compared to the prior art. Due to the increased adjustment function of the novel regulation system, it is possible according to the invention to dispense with the use of a cost- and space-intensive reversing draw-off system.

Additional advantages, features, and details are found in the following description, wherein multiple embodiments of the invention are described in detail with reference to the drawings. The features indicated in the claims and in the description can each be essential to the invention individually or in any combination. In the drawings:

Figure 1:
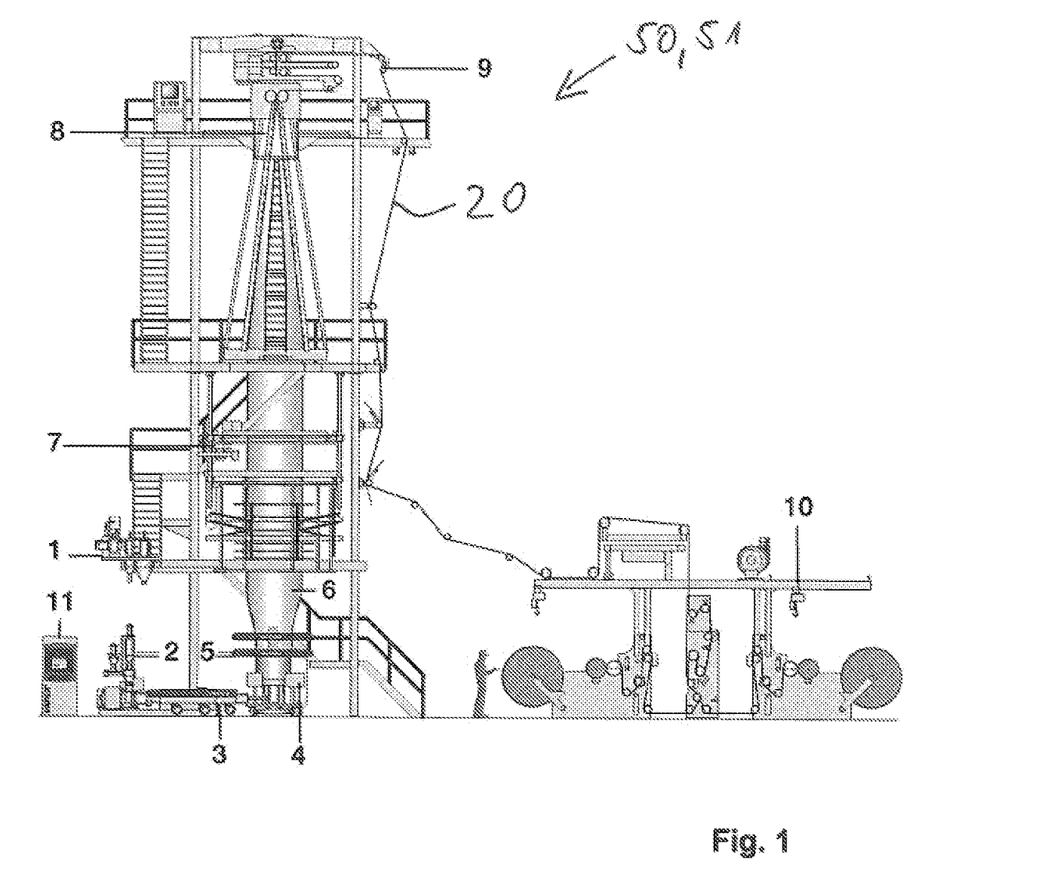
FIG. 1 shows a purely schematic view of a film extruder having a cooling device according to the invention.

A film extruder 50 for the production of a film 20 is illustrated in FIG. 1. The film extruder 50 is a blown film extruder 51 which is equipped with a blower head 4 which allows the exit of the film 20. In addition, a cooling device 5 is included for the purpose of cooling the film 20 exiting from the blower head 4. The film 20 is a film tube 20 in the present embodiment. A blower diameter regulator 6 is included at a distance from the blower head 4 and the cooling device 5, and checks the diameter of the film tube 20. A film thickness measuring device is arranged above the blower diameter regulator 6, and checks the film thickness over the entire periphery of the film tube 20 during the production of the film 20. A reversing draw-off device 8 can be arranged at the upper region of the blown film extruder 51. Moreover, a width measurement device/regulator 9 is included. A winding of the film tube 20 occurs in the region of the film spool 10. The film thickness measurement is carried out capacitively in the present embodiment.

In addition, the blown film extruder 51 has a vacuum conveyor 1 for the plastic granulate. Also a gravimetric throughput regulator 2 is included which carries out a material measurement of the plastic granulate which is conveyed into an extruder 3. The heated plastic granulate leaves the blower head 4 via a defined gap, wherein the film tube 20 is blown and must be cooled in the most precise possible manner by means of the cooling device 5 in order to achieve a corresponding wall thickness and/or profile thickness of the film tube 20.

In addition, an electronic device 11 is included which can have date and/or signal communication with all the components beginning with reference numbers 1 to 10. According to FIG. 2, the cooling device 5 is shown with the film tube. The cooling device 5 has multiple regulator elements 30 by means of which it is possible to adjust the flow volume of cooling gas 12 and the cooling gas temperature at the same time. In this case, the regulator element 30 comprises a valve element 31 and a heating element 32. The valve element 31 is coupled to the heating element 32. In the present embodiment, the valve element 31 is a bimetal adjuster element 31a which is temperature-sensitive and can deform based on a changing cooling gas temperature and/or a changing temperature of the heating element 32, thereby making it possible to change the cross-section of the cooling gas channel 33 by means of the bimetal adjuster element 31a. This means that the free end 31c of the bimetal adjuster element 31a can change its position based on the changing temperature inside the cooling gas channel 33, such that the cross-section through which the flow volume of cooling gas 12 exits in the direction of the film 20 can be changed.

Figure 2:
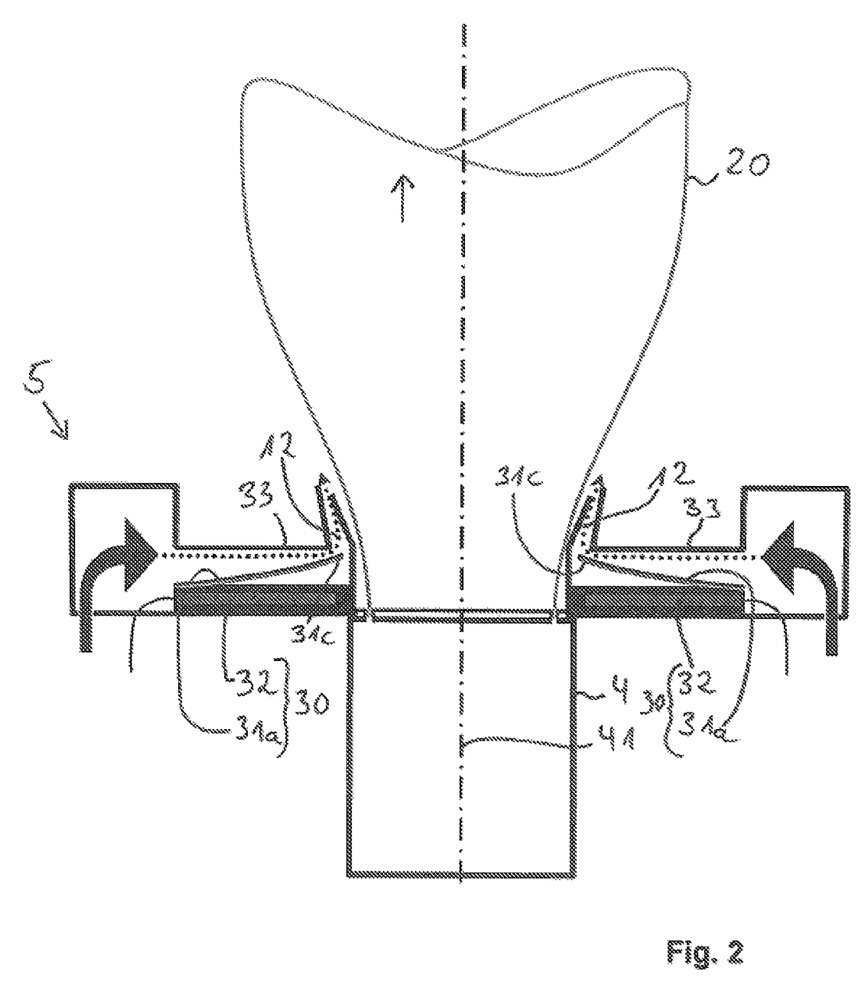
FIG. 2 shows an enlarged view of the cooling device according to FIG. 1.

The cooling device 5 can be adjusted in such a manner that the flow volume of cooling gas 12 is reduced at higher temperature, since the cooling gas channel cross-section 33 is reduced due to the bimetal adjuster element 31a. As a result of the lower flow volume of cooling gas 12 which is directed at a defined point on the film tube 20, and as a result of the increased cooling gas temperature, a lower cooling effect is applied to this defined point on the film 20 and/or on the film tube 20, such that the melt of the film tube 20 on this point can be made longer and accordingly thinner. As such, the film tube 20 is drawn out further at this point, and a segmental thinning of the film thickness results. An increase in the film thickness is realized by an increase in the flow volume of cooling gas 12 and a lowering of the cooling gas temperature.

As is shown in FIG. 2, the blower head 4 is positioned immediately below the cooling device 5. It can likewise be contemplated that the cooling device 5 is arranged at a distance from the blower head 4. The heating element 32 is a heating cartridge in the present case.

Figure 3:
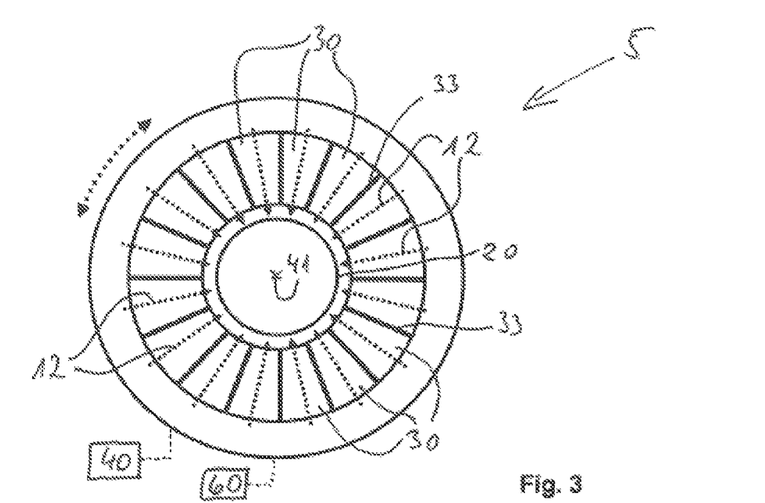
FIG. 3 shows a schematic top view of a cooling device.

FIG. 3 shows particularly clearly that the cooling device 5 can be a cooling ring 5 which can be a composite of a plurality of regulator elements 30, wherein each regulator element 30 has the principle construction as shown in FIG. 2. This means that each regulator element 30 can be constructed as a heating element 32 with a bimetal adjuster element 31a attached to the same. The flow volume of cooling gas 12 can flow over the periphery of the film tube 20 at all points, and the thickness of the film 20 can be influenced in this manner. In addition, it can be contemplated that a drive device 40 is included which can move the cooling device 5 about the axis of rotation 41. It can likewise be contemplated that that the drive device 40 can only move the regulator elements 30 about the axis 41. In this way, the configuration allows that each point on the film tube 20 can be reliably exposed to the flow volume of cooling gas 12, thereby making it possible to achieve a reliable influence of the film thickness.

As an alternative, it can be contemplated that an electronic control 60 functions such that each regulator element 30 or group of regulator elements 30 is/are controlled individually. Both the drive device 40 and the electronic control 60 function such that it is possible to produce an artificial thick point and/or thin point on the film tube 20. In this manner, the configuration prevents the creation of an undesired circular ring on the film spool 10 which is a great disadvantage in the prior art. In general, according to the prior art, the formation of a circular ring is prevented by means of a cost-intensive, reversing draw-off device 8.

Figure 4:
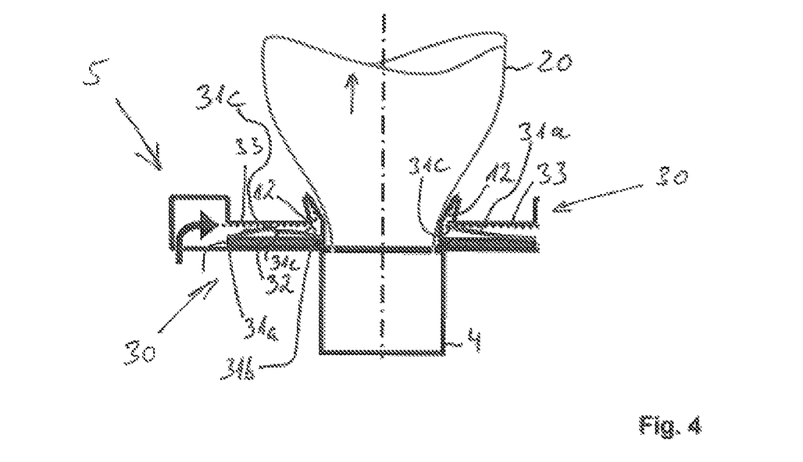
FIG. 4 shows an additional embodiment of a cooling device.

An additional embodiment of a cooling device 5 is illustrated in FIG. 4, and likewise consists of a plurality of regulator elements 30 which are arranged around the periphery of the film tube 20. The functionality of the cooling device 5 substantially corresponds to the cooling device 55 in FIG. 2. However, an essential difference is that according to FIG. 4, the valve element 31 is constructed from two bimetal adjuster elements 31a, 31b. Each bimetal adjuster element 31a, 31b has a free, moving end 31c. The two free ends 31c are arranged neighboring each other. Each bimetal adjuster element 31a, 31b has a stationary attachment region, and the stationary attachment regions face away from each other. It has been shown that it is possible to reduce and/or prevent turbulence effects inside the cooling gas channel 33 and/or upon the exit of the flow volume of cooling gas 12 in the direction of the film 20 by using these two bimetal adjuster elements 31a, 31b, wherein the same can at least partially overlap. Only the left regulator element 30, with the two bimetal adjuster elements 31a, 31b is shown in FIG. 4. Of course, all regulator elements 30 which are arranged peripherally around the film 20 can each be designed with these two bimetal adjuster elements 31a, 31b. The regulator element 30 on the right is only shown, for reasons of presentation, in the embodiment in FIG. 2.

Figure 5:
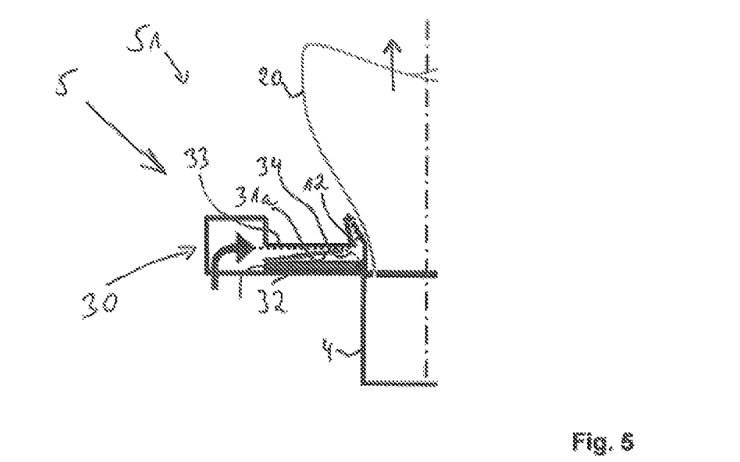
FIG. 5 shows an additional embodiment of a cooling device.

An additional embodiment is shown in FIG. 5, wherein the bimetal adjuster element 31a is sheathed by a flexible film 34. The functionality of this regulator element 30 substantially corresponds to the functionality in FIG. 2. The use of the flexible film prevents and/or reduces turbulence effects as in FIG. 4.

Figure 6:
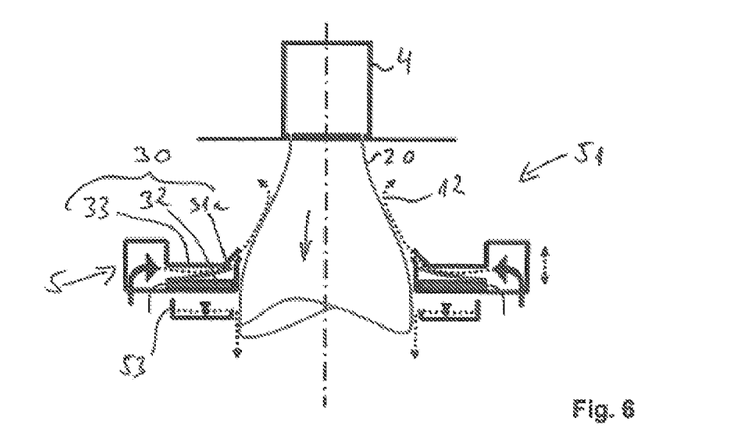
FIG. 6 shows a cooling device which is used in a blown film extruder with water cooling.

In FIG. 6, the cooling device according to the invention is used in a vertical, downward oriented blown film extruder 51 with water cooling 53. As is shown in FIG. 6, the cooling 53 of the film tube 20 is realized with a counter current, because the water-cooled blown film 20 exits from the blower head 4 from above, moving downward. It has been surprisingly demonstrated that the flow volume of cooling gas 12 flowing in counter current involves low turbulence, particularly near the cooling water surface, such that it is possible to achieve an optimum visual appearance of the film.

Figure 7:
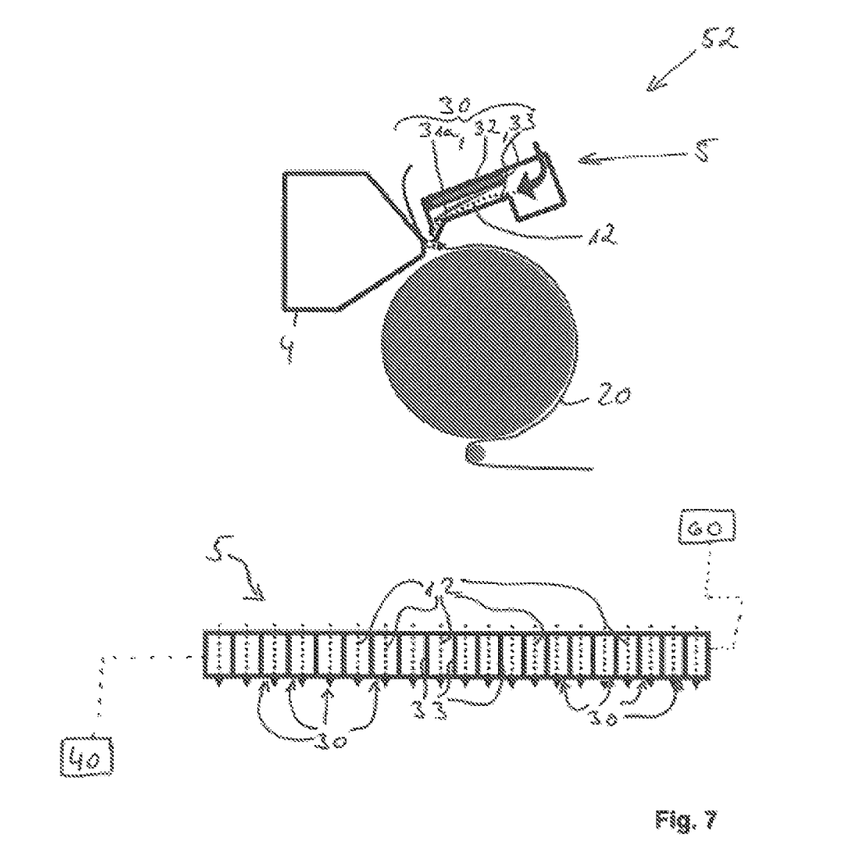
FIG. 7 shows a cooling device which is used in a sheet film extruder.

In FIG. 7, the cooling device 5 is shown as a rod-shaped cooling element 5 which is constructed from a plurality of regulator elements 30 which are arranged next to each other linearly. The cooling device 5 in this case is used in a sheet film extruder 52, wherein the functionality of the regulator element 30 as concerns the influencing of the film 20 corresponds to the embodiments according to FIG. 2. The only difference is that in FIG. 7 the film 20 is a sheet film 20. In addition, it can be contemplated that the cooling device 5 according to FIG. 7 and/or its regulator elements 30 can be moved by means of a drive device which is not explicitly illustrated, in order to make it possible to influence the profile thickness of any and all positions on the film 20, as in FIG. 3. The movement of the cooling device 5 and/or the regulator elements 30 occurs laterally in FIG. 7.

Of course, the embodiments according to FIG. 2 to FIG. 7 can be configured with a signal connection to an electronic device 11, as is shown in an exemplary manner in FIG. 1. In addition, a sheet film extruder 52 according to FIG. 7 or a vertical, downward oriented blown film extruder 51 according to FIG. 6 can be equipped with the following devices:

A blower diameter measurement device, a film thickness measurement device, a reversing draw-off device, a width measurement device/regulator, a film spool, etc.

LIST OF REFERENCE NUMBERS 1 vacuum conveyor for granulate
2 gravimetric throughput regulation, material measurement of the plastic granulate
3 extruder
4 blower head
5 cooling device, cooling ring with profile thickness regulation
6 blower diameter regulator
7 film thickness measurement device
8 reversing draw-off device
9 width measurement device/regulator
10 film spool
11 electronic device, automation module
12 flow volume of cooling gas
20 film, film tube, sheet film
30 regulator element
31 valve element
31a bimetal adjuster element
31b bimetal adjuster element
31c free end
32 heating element
33 cooling gas channel, cooling gas channel cross-section
34 flexible skin, film
40 drive device
41 axis of rotation
50 film extrusion apparatus
51 blown film extruder
52 sheet film extruder
53 water cooling
60 electronic control

The invention claimed is:

1. A device for the cooling of a film for a film extrusion apparatus, the device comprising:
   a cooling device, wherein a flow volume of cooling gas can flow out of the cooling device at a cooling gas temperature, in such a manner that the flow volume of cooling gas can flow over the film,
   wherein means are included such that the flow volume of cooling gas and the cooling gas temperature can be adjusted simultaneously,
   wherein at least one valve element is arranged in the cooling device, wherein it is possible by means of the same to modify the flow volume of cooling gas,
   and in that the valve element is a deformable bimetal adjuster element, by means of which it is possible to modify the flow volume of cooling gas upon modification of the cooling gas temperature, by means of narrowing or enlarging a cross-section of the cooling gas channel arranged in the cooling device, wherein the flow volume of cooling gas can be fed through said cooling gas channel,
   wherein a heating element is integrated into the cooling device and wherein the bimetal adjuster element is coupled to the heating element in such a manner that the flow volume of cooling gas which flows around the bimetal adjuster element simultaneously functions so that the bimetal adjuster element accordingly deforms or adjusts via the change in the cooling gas temperature, wherein the flow volume of cooling gas can be varied in this way.

2. A device according to claim 1,
   wherein means are included such that the flow volume of cooling gas is automatically controlled or regulated according to the cooling gas temperature, or the cooling gas temperature is automatically controlled or regulated by the flow volume of cooling gas.

3. A device according to claim 1,
   wherein at least one regulator element is arranged in the cooling device, and the valve element and a heating element are integrated into the regulator element in order to simultaneously control and/or to regulate the flow volume of cooling gas and the cooling gas temperature.

4. A device according to claim 1,
wherein the cooling device or the regulator elements can move translatively, or can move back and forth, or are reversible, laterally, along the film, wherein the cooling device or the regulator elements can particularly move, or move back and forth, or are reversible, around the film tube, and wherein the cooling ring or the regulator elements can be moved by means of the drive device about an axis of rotation between 0 and 360°.

5. A device according to claim 1,
wherein a continuous, adjusted electronic control is included for the regulator elements, thereby making it possible to carry out an electronic reversal of the regulator elements.

6. A device according to claim 5,
wherein the electronic control controls the regulator elements by giving a variable displacement speed and/or by giving a variable adjustment variable and/or by giving a variable speed and/or a constant speed based on random generation,
wherein the electronic control particularly incorporates a correction value in order to control individual regulator elements or groups of regulator elements, thereby making it possible to generate an artificial thickness point formation and/or thin point formation on the film.

7. A device according to claim 1,
wherein the electronic control or the drive device has signal communication with a thickness measuring device.

8. A device according to claim 1,
wherein the valve element is constructed of at least two bimetal adjuster elements,
wherein each bimetal element particularly has a free, moving end, wherein the free ends are arranged neighboring each other, and each bimetal element has a stationary attachment region, and the stationary attachment regions face away from each other.

9. A device according to claim 1,
wherein the bimetal adjuster element is sheathed in a flexible skin.

10. A device according to claim 1, wherein the cooling device or the regulator elements can move translatively, or can move back and forth, or are reversible, laterally, along the film, wherein the cooling device or the regulator elements can particularly move, or move back and forth, or are reversible, around the film tube, and wherein the cooling ring or the regulator elements can be moved by means of the drive device about an axis of rotation between 5 and 45°.

11. A film extrusion apparatus for the production of a film, having
a blower head which allows the exit of the film,
a cooling device for the purpose of cooling the film exiting the blower head, a thickness measuring device for the purpose of measuring the film thickness,
an electronic device which is particularly designed as a control and/or regulating device, wherein the electronic device has signal communication with the cooling device and the thickness measuring device in order to influence the film thickness,
wherein a flow volume of cooling gas can flow out of the cooling device at a cooling gas temperature, in such a manner that the flow volume of cooling gas can flow over the film,
wherein means are included such that the flow volume of cooling gas and the cooling gas temperature can be adjusted simultaneously,
wherein at least one valve element is arranged in the cooling device, wherein it is possible by means of the same to modify the flow volume of cooling gas,
and in that the valve element is a deformable bimetal adjuster element, by means of which it is possible to modify the flow volume of cooling gas upon modification of the cooling gas temperature, by means of narrowing or enlarging a cross-section of the cooling gas channel arranged in the cooling device, wherein the flow volume of cooling gas can be fed through said cooling gas channel,
wherein a heating element is integrated into the cooling device and wherein the bimetal adjuster element is coupled to the heating element in such a manner that the flow volume of cooling gas which flows around the bimetal adjuster element simultaneously functions so that the bimetal adjuster element accordingly deforms or adjusts via the change in the cooling gas temperature, wherein the flow volume of cooling gas can be varied in this way.

12. A film extrusion apparatus according to claim 11,
wherein the cooling device is integrated into the blower head, wherein the film extrusion apparatus is particularly designed as a blown film extruder, and particularly in that the film extrusion apparatus is designed as a vertical, downward oriented blown film extruder with water cooling.

13. A film extrusion apparatus according to claim 11, wherein the film extrusion apparatus is designed as a sheet film extruder.

* * * * *